April 1, 1930.  H. A. BRUNN  1,752,368
SEAT MOUNTING FOR AUTOMOBILES
Filed June 28, 1928
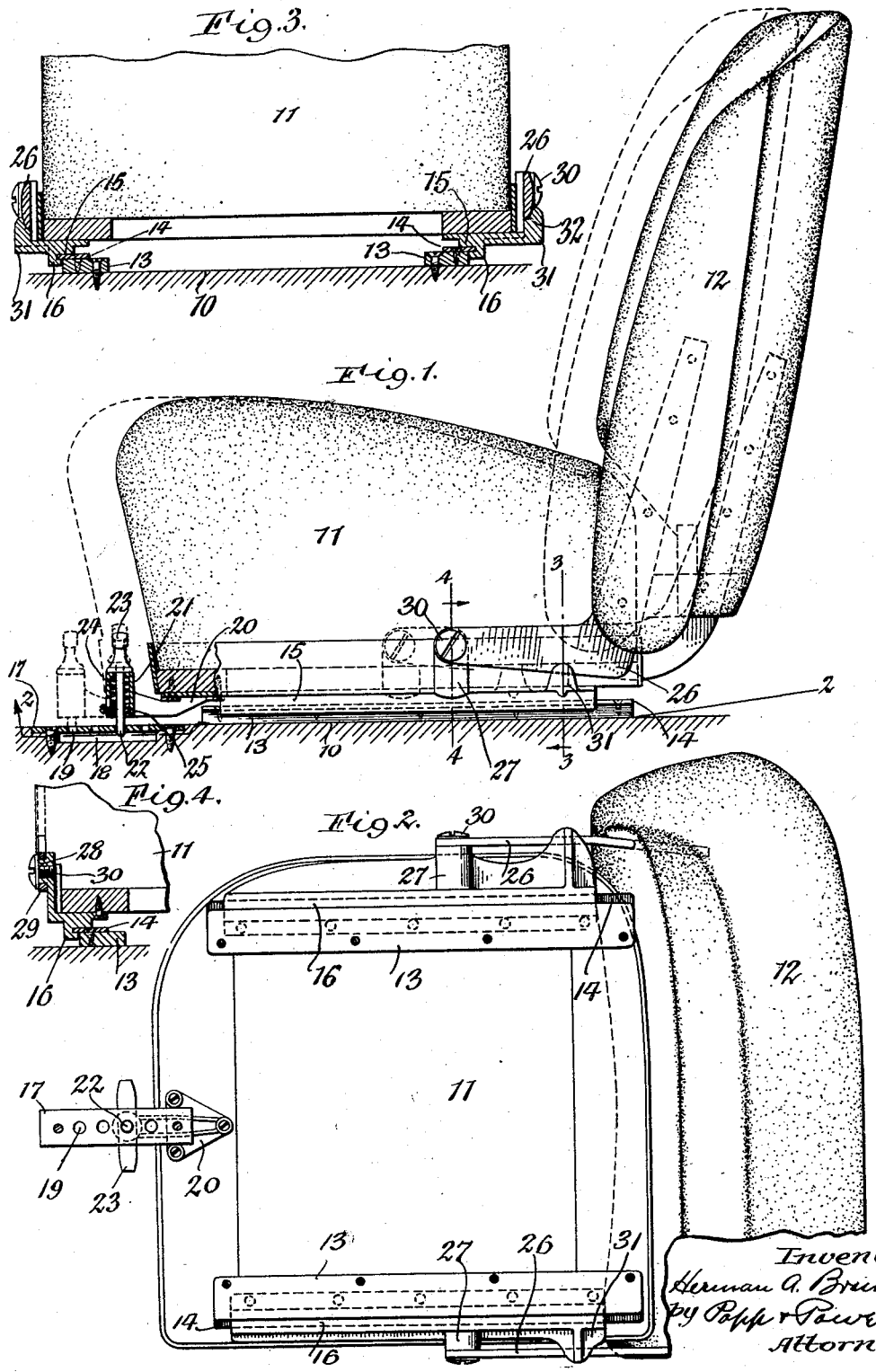
Inventor
Herman A. Brunn
by Popp & Powers
Attorneys Patented Apr. 1, 1930

1,752,368

UNITED STATES PATENT OFFICE

HERMANN A. BRUNN, OF BUFFALO, NEW YORK, ASSIGNOR TO BRUNN AND COMPANY, INC., OF BUFFALO, NEW YORK, A CORPORATION OF NEW YORK

SEAT MOUNTING FOR AUTOMOBILES

Application filed June 28, 1928. Serial No. 289,018.

This invention relates to a seat for automobiles which is capable of sliding lengthwise on the body in order to adjust the same to the length of legs of the driver and which is also capable of being completely removed from the body for convenience in cleaning and repairing the car.

It is the object of this invention to provide means for detachably and adjustably mounting a seat on the body of an automobile which is simple and compact, easily operable and not liable to get out of order.

In the accompanying drawings:—

Figure 1 is a side elevation, partly in section, of a seat mounted on a body of an automobile in accordance with my invention.

Figure 2 is a bottom plan view of the seat and the means for mounting the same on the body.

Figures 3 and 4 are fragmentary vertical transverse sections taken on the corresponding numbered lines in Fig. 1.

In the following description similar characters of reference indicate like parts in the several figures of the drawings.

The numeral 10 represents the floor of a car or automobile, 11 one of the seats and 12 the back rest for the seat, all of which may be of any suitable or well known construction so far as the purposes of the present invention are concerned.

The seat is slidably mounted on the floor so as to permit of moving the same lengthwise and adapt the same to the length of the driver's legs and enable him to conveniently reach the various foot operated parts of the car, also to permit of forming a passageway for greater convenience in entering and leaving the car, and also to permit complete removal of the seat to facilitate cleaning and render the parts accessible for repairs.

The means whereby the seat is thus mounted on the floor are constructed as follows:—

The numeral 13 represents a pair of parallel longitudinal sleepers or bolsters secured to the upper side of the floor at a suitable distance apart and constructed of wood or other suitable material.

Upon each of these sleepers is mounted a longitudinal rail or track 14 having preferably the form of a plate made of metal and having one of its longitudinal edges projecting laterally beyond the adjacent longitudinal side of the respective sleeper.

On its underside adjacent to opposite ends thereof the seat is provided with two runners which are adapted to slide lengthwise on the rails of the floor. Each of the runners is constructed of metal and preferably has a shoe 15 extending nearly the full length of the seat and sliding on top of one of the rails and a hook 16 extending downwardly from the shoe and receiving the laterally projecting edge of the respective rail. By these means the seat is held against vertical movement relatively to the floor but is capable of sliding lengthwise on the rails into different positions as best suits the requirements of the driver and also permits of easily forming a gangway for passengers. By sliding the runners off the rails at one end or the other the seat can be wholly removed from the floor so as to facilitate cleaning of the car and also to render the parts more freely accessible for inspection and repairing.

Various means may be employed for fastening the seat against longitudinal movement when the same has been shifted into the desired position, those shown in the drawings being preferred and constructed as follows:—

The numeral 17 represents a longitudinal locking plate secured to the front part of the floor over a recess 18 therein and provided with a longitudinal row of openings 19. Above the locking plate and lengthwise in line therewith is arranged a bracket 20 which is secured to the underside of the front part of the seat and provided in front of the seat with a vertical casing 21 preferably of tubular form. Movable vertically in this casing is a locking pin 22 which is adapted to engage its lower end with one or another of the openings 19 in the locking plate. Above the casing the locking pin is provided with a handle 23 whereby this may be lifted out of engagement with the locking plate by reaching with the hand downwardly in front of the seat, which handle may also engage the top of the casing for limiting the downward movement of the locking pin.

The locking pin is yieldingly held in its depressed position and in engagement with the locking plate by a spring 24 arranged within the casing and bearing at its upper end against the top of the casing and at its lower end against a collar 25 secured to the locking pin within the casing, as shown in Fig. 1.

Upon raising the locking pin the seat is unlocked from the floor and can be moved lengthwise to the desired position, and upon releasing the locking pin the spring shifts the pin into engagement with the locking opening 19 in register therewith and thereby holds the seat against longitudinal displacement.

Although the folding of the back rest may be accomplished in various ways it is preferable to employ the means shown in the drawings which are constructed as follows:

At opposite ends of the seat are arranged folding arms 26 preferably of elbow form, each of which is pivotally connected at its lower end with one of the runners while its upper end is connected with the respective end of the back rest. The pivoted connection between each folding arm and runner preferably consists of a bracket 27 projecting laterally and upwardly from the central part of each runner and provided at its upper end with a laterally projecting pivot boss 28 which receives a pivot eye 29 on the lower end of the respective folding arm, and a retaining screw 30 secured to the pivot boss and having its head overlapping the respective folding arm so as to confine the same on the pivot boss.

By pivotally mounting the back rest on the seat in this manner the same can be swung back into an upright operative position, as shown in Fig. 1, or the same can be folded forwardly over the seat in order to provide a passageway in the car and permit of conveniently entering and leaving the same.

The back rest is supported in its unfolded operative position by means of stop lugs 31 projecting laterally and upwardly from the rear parts of the runners and each provided on its upper inner part with a rabbet seat 32 on which the adjacent folding arm rests when swung into its rearmost position and thereby holds the back rest upright, as shown in Fig. 1, and also prevents these arms from spreading, as shown in Fig. 3.

This manner of adjustably and foldably mounting the seat and back rest is particularly advantageous on account of its simplicity, ease of manipulation and compact organization, enabling the same to be installed without trespassing on room required for other purposes and also avoiding detraction from the neat appearance of the car as a whole.

I claim as my invention:—

1. A device of the character described, comprising longitudinal rails mounted on the floor of the car, a seat having runners slidable lengthwise on said rails, a back rest, and means for foldably connecting said back rest with said seat including arms pivoted on said runners, and stops arranged on said runners and adapted to be engaged by said arms.

2. A device of the character described, comprising longitudinal rails mounted on the floor of the car, a seat having runners slidable lengthwise on said rails, a back rest, and means for foldably connecting said back rest with said seat including pivot brackets projecting upwardly from said runners and each having a laterally projecting pivot boss, arms secured to the ends of said back rest and each having an eye turning on one of said pivot bosses, screws secured to said bosses and each engaging its head with the outer side of one of said arms, and upwardly projecting lugs arranged on the rear parts of said runners and each having a rabbet stop seat at its upper end which is adapted to be engaged by the arm on the adjacent end of the back rest.

In testimony whereof I hereby affix my signature.

HERMANN A. BRUNN.